United States Patent

[11] 3,591,719

[72] Inventors Fred B. Crowson
Monmouth Beach;
Richard A. Previte, Morganville, both of, N.J.

[21] Appl. No. 735,317
[22] Filed June 7, 1968
[45] Patented July 6, 1971
[73] Assignee Bell Telephone Laboratories, Incorporated
Murray Hill, N.J.

[54] AUTOMATIC PROGRAM TEST CIRCUIT FOR DATA SETS
8 Claims, 3 Drawing Figs.

[52] U.S. Cl. ........ 178/69
[51] Int. Cl. ........ H04l 25/02
[50] Field of Search ........ 178/69 A, 69 G, 69; 328/162

[56] References Cited
UNITED STATES PATENTS
3,335,223 8/1967 Johannesson et al. ........ 178/69
3,500,216 3/1970 Peterson et al. .............. 178/69

*Primary Examiner*—William C. Cooper
*Assistant Examiner*—Douglas W. Olms
*Attorneys*—R. J. Guenther and Kenneth B. Hamlin

ABSTRACT: An automatic test circuit for simultaneously testing a plurality of data sets wherein the test circuit provided for each data set a multiphase program which includes sending test signals to the data set and measuring the distortion of signal received from the data set. During a measuring phase the test circuit enables each data set to contend for a common measuring circuit to apply signals to the measuring circuit upon seizure thereof and to thereafter release from the measuring circuit in response to a signal from the data set. The test circuit then either advances to the next program phase if the distortion of the measured signals is below a predetermined threshold level or again bids for the measuring circuit to repeat the measuring phase if the distortion exceeds the threshold level.

INVENTORS F. B. CROWSON
R. A. PREVITE
BY R C Lipton
ATTORNEY

AUTOMATIC PROGRAM TEST CIRCUIT FOR DATA SETS

FIELD OF THE INVENTION

This invention relates to automatic test circuits for providing sequential tests of data stations in accordance with multiphase programs and, more particularly, to test gear for performing various tests, including measuring tests on signals originating from remote data station sets.

DESCRIPTION OF THE PRIOR ART

In data communication systems, such as line switching systems and store and forward systems, central switching offices interconnect large numbers of subscriber data stations. Each data station is arranged to provide a source or generator of data signals, such as a data tape reader or teletypewriter, a data signal recorder or printer and a set for transmitting the locally generated date signals to the central office and receiving incoming date signals from the central office and applying them to the data recorder. In addition, the data station preferably includes equipment controlled by selection signals from the central office for providing various functions such as starting the teletypewriter to send the message in the tape, enabling the recorder to read and print incoming date signals and generating answerback signals.

This station equipment, hereinafter called a subscriber or customer data set, must be periodically tested to insure that the station is properly receiving the data and properly responding to received data signals and, in addition, to insure that the central office is receiving the data signals from the subscriber. The response of the data set selective equipment can be tested by sending the appropriate selection signals from the central office. The data set receiver and printer can be checked by transmitting from the central office distorted and undistorted test sentences. Finally, the data set transmitter can be tested by a distortion measuring set at the central office. Accordingly, testing systems, sometimes called test lines, are provided at the central office to automatically advance through multiphase test programs wherein the distorted and undistorted test sentences are generated and transmitted, appropriate selection signals are sent to unblind the station printer and start the station transmitter and the distortion of the answerback signals and the tape message signals are measured with the results of the measurements being returned to the subscriber.

Since modern systems interconnect large numbers of stations, it is preferable that the test line be arranged to simultaneously handle testing for a plurality of data stations. In known arrangements, test lines each include, as common equipment, a test sentence generator and a distortion measuring set since these equipments are the most complex and costly. Nevertheless, the test line can be connected to a multiplicity of subscribers and test sentences and selection signals can be simultaneously sent to the stations concurrently in the same phase of the test program. However, only one data set at a time can seize the distortion measuring set during the receiving test phase. To accommodate the many subscribers, the test line therefore limits the time that any data set maintains exclusive control over the measuring set, advancing the program for the subscriber to the next phase when the time limit is reached. This leads to difficulty if the subscriber is not fully prepared to provide the tape message data signals when the distortion measuring set is seized (due, for example, to maintenance or adjustments being performed to satisfy prior tests). In addition, the subscriber has no opportunity to insure that he has made proper adjustments for an unsuccessful receiving test (wherein the test line reported that the measured distortion is beyond satisfactory limits) before the test line advance to the next phase of the program.

SUMMARY OF THE INVENTION

Accordingly, it is an object of this invention to provide the subscriber opportunity to make appropriate adjustments when the receiving test is beyond satisfactory limits. Advantageously, this invention permits repetition of the unsuccessful test rather than advancing to the next phase of the program.

It is another object of this invention to eliminate seizure of the measuring circuit before the customer is prepared to send the tape message. In accordance therewith, seizure is precluded until the subscriber indicates that he is ready.

It is a feature of this invention that after a receiving test, the test line controls the selection of the next phase in the program in accordance with the level of the distortion measurements. Specifically, the program is advanced to the next phase when the measurement set indicates that the level is within satisfactory predetermined limits and, alternatively, is recycled to the beginning of the presently completed phase when the indicated level is unsatisfactory.

It is another feature of this invention that the test line does not advance into a receiving test phase until a predetermined signal is received from the subscriber date set to insure that the subscriber is ready to transmit the data signals. Thereafter, when the measuring circuit completes the measurements and is released to become available to other data sets, the test line program pauses to enable the subscriber to make appropriate adjustments, etc. The advance of the program is then again initiated when the predetermined signal is received from the subscriber (advancing to the next phase if the test was within limits or repeating the prior phase if the test was unsatisfactory).

The foregoing and other objects and features of this invention will be more fully understood from the following description of an illustrative embodiment thereof taken in conjunction with the accompanying drawings.

DETAILED DESCRIPTION

Figure 1:
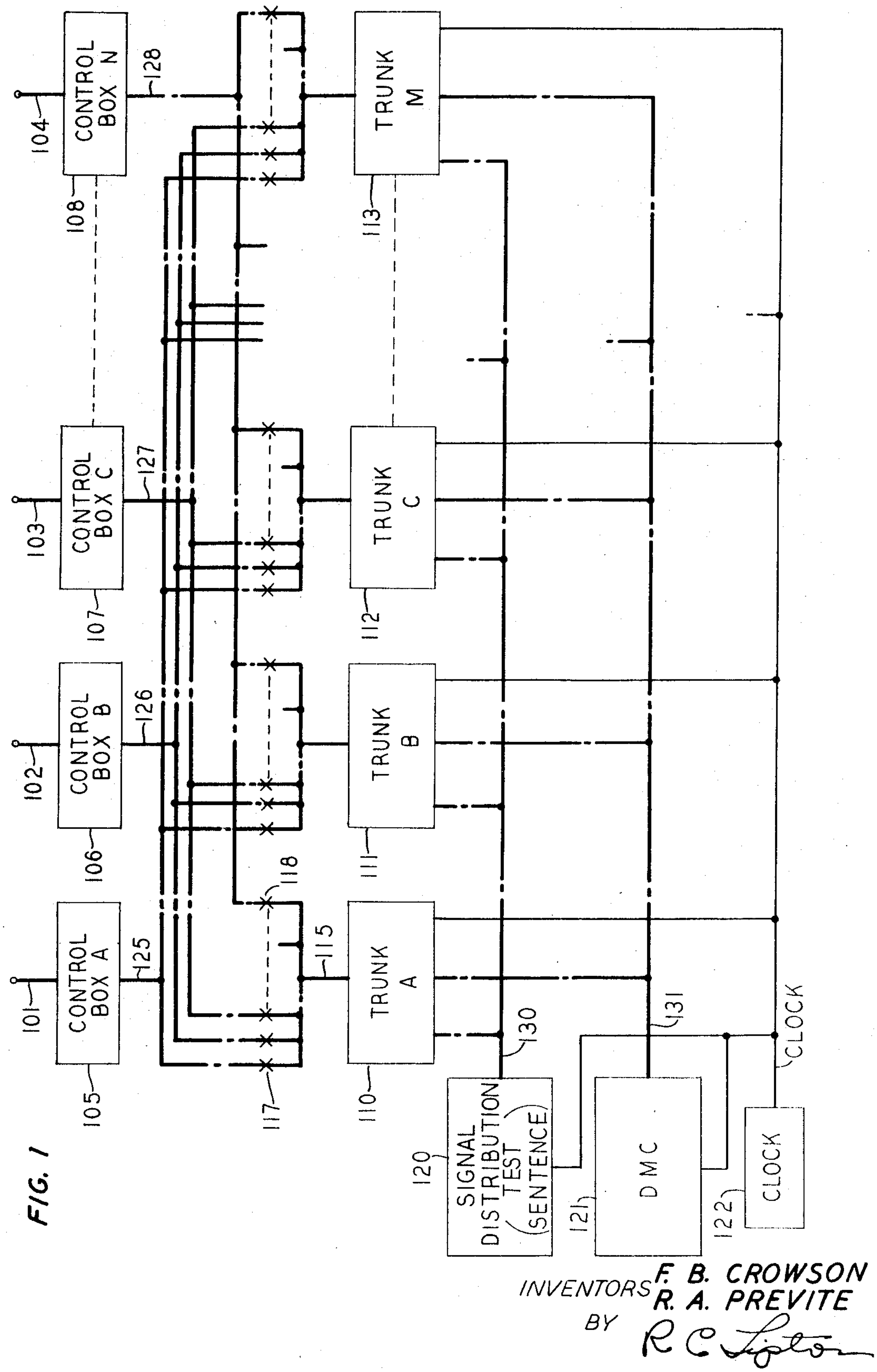
FIG. 1 is a block diagram showing an arrangement for an automatic program test circuit in accordance with this invention.

Refer now to FIG. 1 showing, in block form, the apparatus at the test center. In general, the apparatus includes a plurality of attendant sets, hereinafter called Control Boxes, shown as blocks 105 through 108. The test center also has Trunk circuits 110 through 113 and equipment common to the trunk circuits comprising Test Sentence Signal Distribution circuit 120, Distortion Measuring circuit (DMC) 121 and Clock 122.

Each control box includes a plurality of keys and switches and lamps, not shown, to provide functions described hereinafter. The control boxes are connected to lines 101 through 104, which lines terminate in plugs to enable to test center attendant to extend any line through a switchboard to a teletypewriter line of a subscriber. Control Boxes 105 through 108 also are connected to cables 125 through 128, which cables are each extendible to any one of Trunks 110 through 113 by way of sets of normally open contacts such as contact sets 117 and 118.

Signal Distribution 120 includes circuitry under control of Clock 122 for generating a test sentence, a signal distortion set for distorting the test sentence to provide switched combination distortion and switched bias distortion and circuitry for generating code sequences identifying whether the test sentence is either undistorted or distorted in the above described manner. Signal Distribution 120 also includes logic switch means for applying to three output leads the undistorted test sentence, the switched bias distortion test sentence and the switched combination distortion test sentence, respectively, and, interposed therewith, the code sequence identifying the type of distortion, if any, of the accompanying test sentence. Arrangements for providing test sentences with appropriate distortion together with an identifying code sequence are well known in the art. One example of such an arrangement is disclosed in FIG. 1 and FIG. 2 of U.S. Pat. No. 3,136,851 which issued to F. B. Crowson et al. on June 9, 1964. In addition, Signal Distribution 120 applies to a fourth output lead a periodic LETTERS code character. All of these four output leads are simultaneously passed by way of cable 130 to the several trunk circuits.

Figure 3:
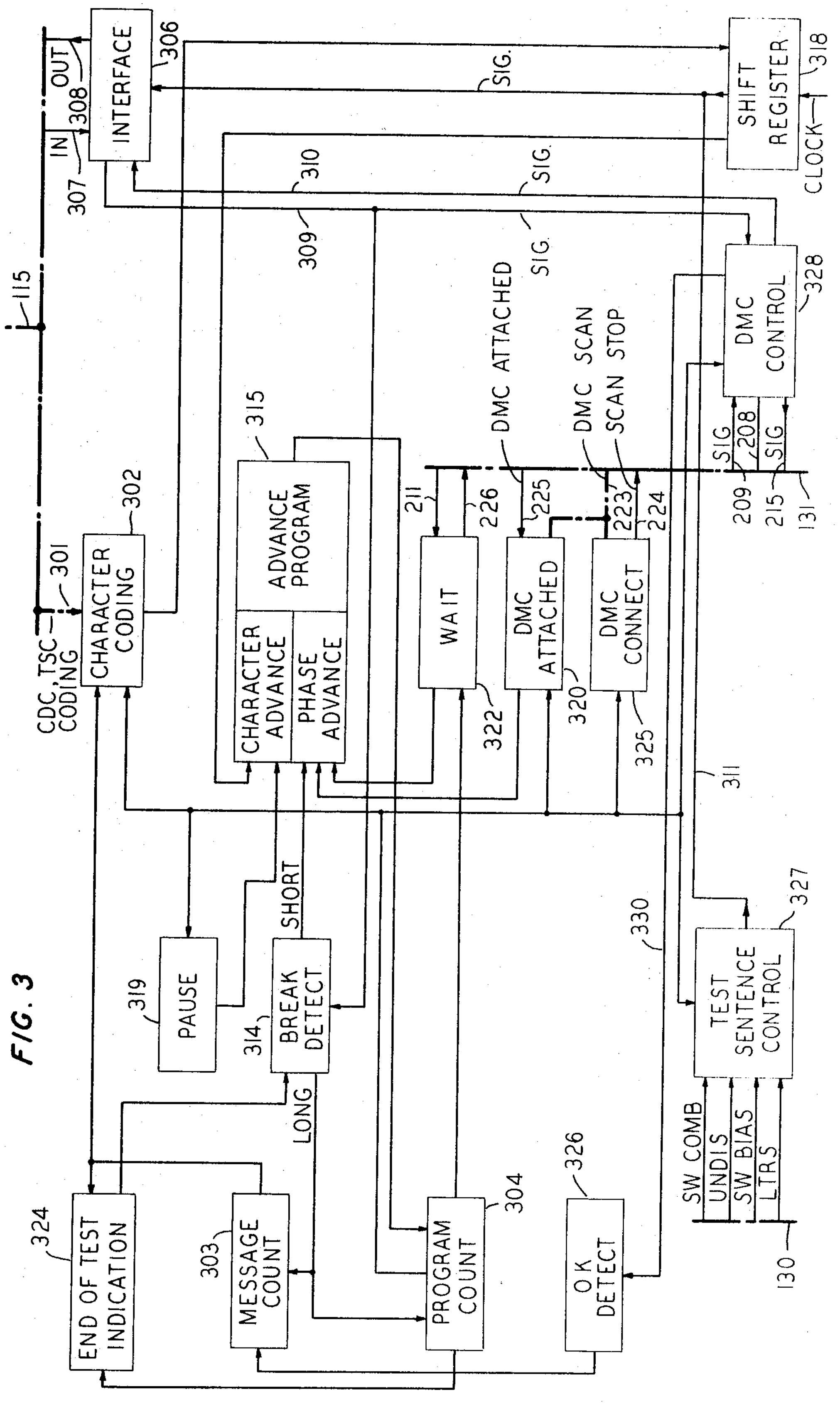
FIG. 3 shown in block form schematic drawing of a trunk circuit which designates the phase of the program, generates and transmits the selection signals and controls the seizure of the distortion measuring circuit.

Distortion Measuring Circuit (DMC) 121 functions to measure the distortion of incoming data signals coming in over a line in cable 131 and supply a code sequence, under control of Clock 122, back over a line in cable 131 indicating the distortion measurement. A suitable arrangement for measuring distortion and returning a code sequence indicating the measurement is shown in FIGS. 3, 6 and 9 of the above-identified Crowson et al. patent. DMC 121 also includes circuitry for scanning for idle trunk circuits and for affecting connection to and release from any trunk, all over lines in cable 131.

Each trunk circuit controls the test program of the teletypewriter subscriber connected to the trunk. More specifically, the trunk circuit includes logic circuitry, described in detail hereinafter, for monitoring signals from the subscriber, advancing the phase of the program as each test is completed and the subscriber indicated readiness to proceed to the next test, generating and transmitting appropriate test sequences for several test phases, selecting an appropriate test sentence of Signal Distribution 120 during sending phases of the program and seizing DMC 121 for the receiving phases.

Consider now the program sequence for testing a subscriber teletypewriter. Initially, the teletypewriter subscriber or a maintenance man at the subscriber station advises the switching test center at the central office that he desires to test the subscriber equipment. The attendant at the test center thereupon connects the teletypewriter line of the customer to a control box. This can be done, for example, by extending the line of the teletypewriter customer through a switchboard, not shown, to a teletypewriter line, such as line 101, connected to Control Box 105.

With the teletypewriter to be tested connected to a control box, such as Control Box 105, the attendant now proceeds to connect up to a trunk. Initially, the attendant determines which trunk is idle and operates appropriate keys in Control Box 105, operating, in turn, connect relays, not shown, in the idle trunk. Assume in this case that Trunk 110 is idle. Connect relay contacts 117 would thereby by closed, connecting cable 125 to cable 115 thereby connecting up Trunk 110 with Control Box 105. With the connection established, the attendant then operates appropriate keys and switches to indicate to Trunk 110, via cable 125, the call directing codes and transmitter start codes of the teletypewriter customer. With Trunk 110 now seized, it returns a steady marking condition to line 101 and thus to the teletypewriter line of the subscriber and monitors the line for a break signal from the customer, as described in more detail hereinafter. At this time, presumably, the attendant at the teletypewriter customer is providing routine maintenance in preparation for the teletypewriter test.

Trunk 110 is now monitoring the line for a "short" break or a "long" break signal, i.e., Trunk 110 is arranged, as described in further detail hereinafter, to detect whether the teletypewriter being tested applies a prolonged space signal which is less than a predetermined duration ("short" break) or exceeds a predetermined duration ("long" break). At this time it is anticipated that a "short" break, will be received. Upon the detection of the "short" break, Trunk 110 is advanced to Phase 1 of the program, which is the first of four receiving test phases. Other trunks, of course, may be concurrently in Phase 1 or in any other Phase of their programs since each trunk operates independently of the others, with the exception of portions of the receiving tests, described hereinafter.

Upon Trunk 110 advancing to Phase 1 of the program, coding circuits in the trunk, as described in further detail hereinafter, generate and transmit back over the teletypewriter line the end-of-message code sequence. This has the effect at the teletypewriter being tested to restore any of the circuits or mechanisms thereat to a normal idle condition and place the teletypewriter in the SELECT mode to lock for control characters.

After the generation of the end-of-message code sequence, Trunk 110 proceeds to transmit the call directing code sequence previously determined by the operation of the switches in Control Box 105. It is noted that the teletypewriter returns the answerback code character "V" in response to the call directing code. The test center at this time, however, does not respond to the answerback character. However, Trunk 110 provides an appropriate delay before proceeding to the next action to provide an interval for the remote teletypewriter to generate the answerback response.

After the answerback response interval, Trunk 110 generates the code character carriage-return line-feed sequence to appropriately position the page record at the subscriber teletypewriter. At the conclusion of the transmission of this code sequence, Trunk 110 connects a selected output lead in cable 130 of Signal Distribution 120 to line 101. In Phase 1 this selected lead is carrying the switched combination test sentence. Accordingly, the teletypewriter being tested receives this distorted test sentence with the interposed character sequence identifying the type of distortion. It is noted that the Signal Distribution is continuously generating the test sentence and that, therefore, the initial character transmitted to the teletypewriter may be any part of the sentence and not necessarily the first word or character. This test sentence with the interposed undistorted characters designating the type of distortion is continuously transmitted to the teletypewriter customer until the customer returns a "short" break.

At the remote customer station the attendant thereat observes the printing of the test sentence and adjusts the teletypewriter, if necessary, until the test sentence is received correctly. The remote customer thereupon returns the "short" break signal. When Trunk 110 detects the "short" break from the customer it advances to Phase 2 of the program. In Phase 2, Trunk 110 transfers to a second output of Signal Distribution 120, which, in this case, may comprise an undistorted test sentence. Accordingly, the remote teletypewriter customer receives and undistorted test sentence with interposed characters identifying the test sentence as being undistorted.

Trunk 110 is still monitoring the line for the "short" break signal and when the teletypewriter customer is satisfied that the teletypewriter is receiving the undistorted test sentence properly and returns the break signal, Trunk 110 advances to Phase 3 of the receiving test. In Phase 3, the connection to Signal Distribution 120 is transferred to a third lead which provides the switched bias test sentence and interposed characters indicating this type of distortion. Trunk 110 continues to monitor the line for a "short" break signal and upon the reception advances to Phase 4 of the receiving tests.

In Phase 4 Trunk 110 transfers its connection back to the first lead of Signal Distribution 120, thereupon again receiving the switched combination test sentence with the previously described interposed characters. In addition, Trunk 110 continues to monitor the line for the "short" break signal.

Assume now that Trunk 110, while in Phase 4, receives the "short" break from the teletypewriter customer. Trunk 110 thereupon advances to Phase 5. Phase 5 is the first of two receiving test phases. Each receiving test phase comprises four main portions, namely, a BID mode, a code sequence generating portion, a signal measuring portion and a WAIT mode. Initially, therefore, Trunk 110 is placed in the BID mode wherein the trunk bids for DMC 121. It is noted that the DMC is available to only one trunk at a time.

If DMC 121 is busy, i.e., the DMC is serving another trunk, Trunk 110 cannot seize the DMC. In this event Trunk 110 connects to the output of Signal Distribution 120, which provides the periodic LETTERS characters. This functions to pass the periodic LETTERS characters back to the teletypewriter line, thereby advising the teletypewriter customer that a bid has been made for the DMC but that the DMC is presently busy.

Assume now that the DMC is idle when Trunk 110 makes its bid or, alternatively that with Trunk 110 bidding the DMC ceases to be busy, i.e., becomes idle while the bid is being made. In this event the DMC proceeds to scan the several trunks via leads in cable 131, starting with the trunk next subsequent to the one which had previously seized the DMC. The scanning continues until a trunk making a bid is reached. The bidding trunk recognizes that the DMC scan has reached it and returns a stop signal via a lead in cable 131 to the DMC. The DMC, in turn, stops the scanning and indicates to the bidding trunk that it has seized the DMC and is now attached thereto. At the trunk (which we may assume to be Trunk 110) the signal from the DMC that it has been seized advances the program to the code sequence generating portion of Phase 5.

When Trunk 110 is advanced to the generating portion it generates the end-of-message code sequence, FIGURES-H-LETTERS, followed by the call directing code sequence. These code sequences are transmitted back over the teletypewriter line to the remote teletypewriter customer. The trunk thereupon advances to the signal measuring portion of Phase 5.

At the remote teletypewriter customer the end-of-message code sequences insures that the customer teletypewriter is in the SELECT mode wherein it can respond to the call directing codes. The teletypewriter thereat is then selected by the call directing code sequence and in response thereto returns the "V" answerback character. Concurrently therewith, when the trunk advances to the measuring portion after the transmission of the call directing character, Trunk 110 connects teletypewriter line 101 from Control Box 105 therethrough to the DMC. Accordingly, the "V" answerback character is passed through Trunk 110 to the DMC.

Figure 2:
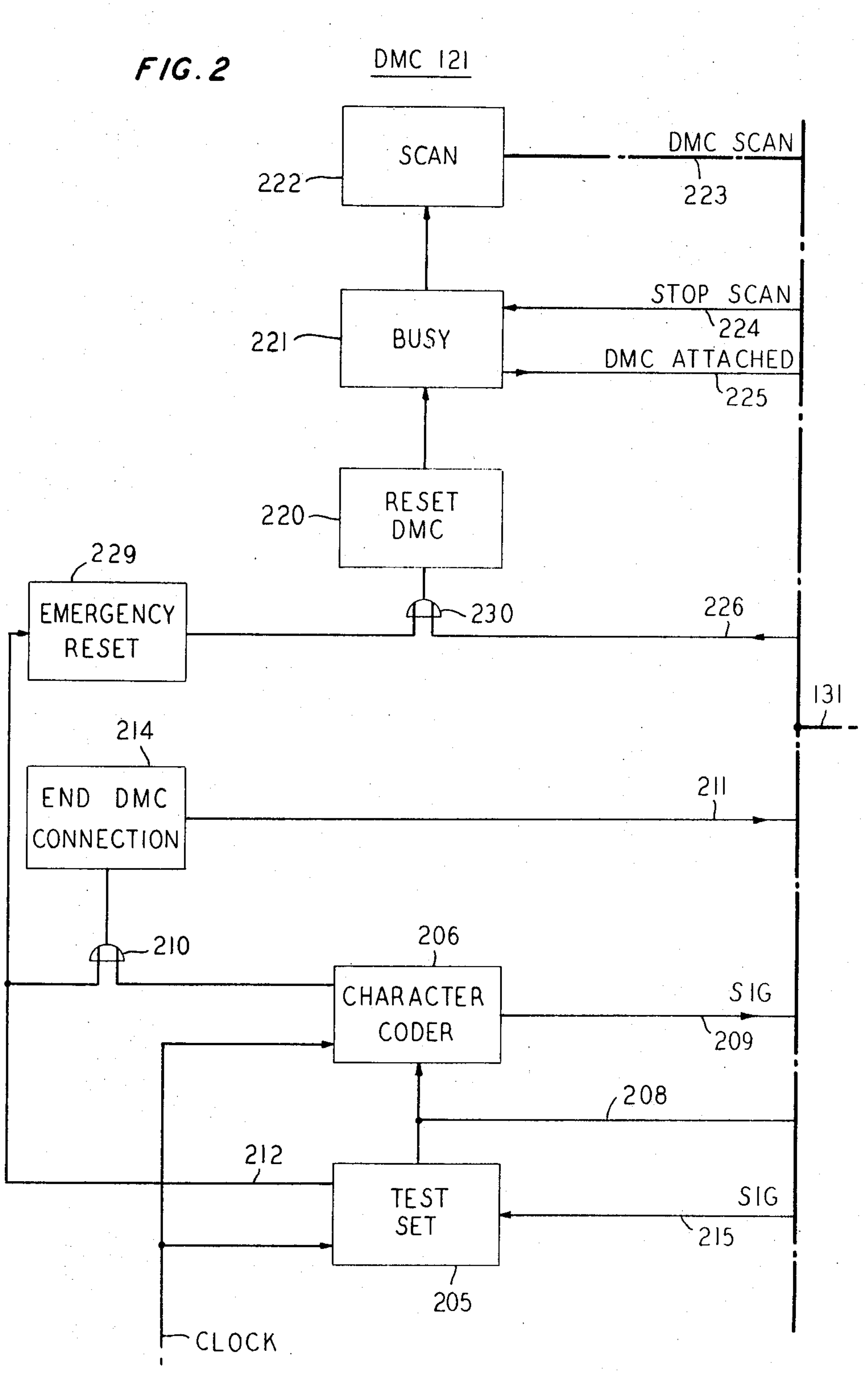
FIG. 2 shows in schematic form a block diagram of the distortion measuring circuit which includes the distortion measuring set and logic circuitry for permitting seizure.

As previously described, Distortion Measuring Circuit (DMC) 121 functions to test the distortion of the incoming characters which, in this case, in the "V" answerback character. As shown in FIG. 2, the DMC includes Test Set 205 and Character Coding and Generating circuit 206. Test Set 205 is arranged to test incoming teletypewriter signals on lead 215 and indicate whether or not these signals are distorted. In addition, the Test Set includes a standard character counter, a short term timer and a long term timer, not shown. The character counter operates to count the characters received by Test Set 205 and, in the event that a predetermined number of characters, such as 32, are received, the counter operates to terminate the examination of the incoming data and apply an appropriate signal to the output of the test set, which signal indicates whether or not the incoming data is distorted. The short term timer, which may comprise a conventional timing circuit, operates in conjunction with the counter and is effective in the event that one or more but less than 32 characters are received. In this event, if the incoming characters cease, the short term timer terminates the measuring of the distortion of the incoming date and operates the test set to apply the appropriate signal to its output. The long term timer operates in the event that the subscriber fails to respond, i.e., the timer operates a predetermined interval after the DMC is connected to the teletypewriter line if no characters are received. This applies a signal to lead 212 to signal an emergency test completion, as described hereinafter.

The output signal of Test Set 205 is applied to Coder 206 and, in addition, directly to the trunk circuit via lead 208 in cable 131. The direct output to the trunk circuit on lead 208 is effective, as described hereinafter, to indicate to the trunk that the distortion is below a predetermined threshold and that the trunk may advance the program. The output to Coder 206 is effective to arrange appropriate coding to transit back to the teletypewriter line, by way of signal lead 209, Trunk 110 and Control Box 105, a code sequence indicating whether or not the distortion of the data signals received from the teletypewriter are below the satisfactory threshold. Finally, Coder 206, after the generating and transmitting of the code sequence, enables DMC 121, as described in detail hereinafter, to apply a signal via lead 211 in cable 131 to Trunk 110 indicating the completion of the DMC test.

Upon Trunk 110 being advised that this first receiving test is complete, it goes to the WAIT mode. In this mode it returns a signal to the DMC, releasing the DMC and thus permitting the DMC to again initate its scan. In addition, the trunk monitors the incoming line for the next "short" break. The DMC is now seized by the next bidding trunk.

If the measured distortion is within satisfactory limits the signal returned via lead 208 to Trunk 110 registers an indication in the trunk that one successful test has been completed. If the measured distortion is beyond the threshold and therefore unsatisfactory, the successful test indication is not returned and the trunk does not register a successful test completion.

With Trunk 110 in the WAIT mode it awaits the reception of a "short" break signal from the teletypewriter subscriber before advancing the program. This permits the teletypewriter subscriber an opportunity to make appropriate adjustments if the DMC has indicated that the signals are distorted. After the appropriate adjustments are made, if necessary, the subscriber sends the "short" break signal.

If the previous test indicated that the distortion was out of limits, no successful test is registered in the trunk, whereby, when Trunk 110 receives the "short" break signal, it advances the program back to Phase 5, and, more specifically, to the BID mode of Phase 5. Thus, as previously described, the trunk bids for the DMC, returning periodic LETTERS characters obtained from Signal Distribution 120 if the DMC is busy and seizing the DMC when it becomes idle and the scan advances to the bidding trunk.

When the DMC is again seized, the trunk program is advanced to the code generating portion of Phase 5, as previously described. The trunk, therefore, again codes up the end-of-message and call directing code sequences and connects the DMC to the teletypewriter line to measure the "V" answerback. Accordingly, the first receiving test is again performed. At the termination of the test the trunk is again placed in the WAIT mode and the DMC is released.

If the prior test had indicated that the distortion is within satisfactory limits, the trunk has registered the one successful test, whereby, when Trunk 110 receives the "short" break signal, the trunk advances to the BID mode of Phase 6 (the second receiving test). In the BID mode, the trunk operates in substantially the same manner as the BID mode of Phase 5 in bidding for the DMC. Thereafter, when the DMC is again seized, Trunk 110 advances to the code generating portion of Phase 6. In this phase portion the trunk codes up the end-of-message sequence FIGURES-H-LETTERS followed by the transmitter start code sequence. After the transmission of these sequences Trunk 110 advances to the measuring portion which is similar to Phase 5. Accordingly, the trunk again connects the teletypewriter line therethrough to the DMC.

At the remote teletypewriter station the reception of the end-of-message sequence followed by the transmitter start code sequence starts up the teletypewriter, thereby sending the tape message inserted therein through Trunk 110 to the DMC. The DMC now proceeds to read and analyze the distortion. In addition, the incoming data characters are counted and after 32 characters are received the reading and analyzing are terminated and Test Set 205 is enabled to signal Coder 206 the results of the test and signal the trunk if the distortion reading is satisfactory.

Accordingly, a code character sequence is returned by Coder 206 through Trunk 110 and Control Box 105 to the teletypewriter line indicating whether or not the distortion of the received tape message is within permissible limits. The DMC thereafter signals Trunk 110 that this second receiving test has been completed.

Trunk 110, in response to the test completed signal from the DCM, advances to the WAIT mode, releasing the DMC. If Test Set 205 previously signaled that the test is unsatisfactory, Trunk 110 does not register a second successful test. Since the trunk has previously registered one successful test, it will again advance, in response to a "short" break signal, back to the Phase 6 BID mode and therefore repeat the second receiving test in the same manner as previously described.

Assume now that the second receiving test result obtained from Test Set 205 indicated that the distortion reading is satisfactory. Trunk 110 thereupon registers a second successful test. When Coder 206 signals the test completion and Trunk 110 advances to the WAIT mode, Trunk 110 signals the termination of the testing by raising visual and audible signals, not shown. The test center attendant, upon observing the signals, removes the line 101 plug from the switchboard, disconnecting line 101 from the teletypewriter line of the subscriber. The attendant also releases Trunk 110 from the connection with Control Box 105, thus making Trunk 110 available to other control boxes. The testing of the subscriber teletypewriter is thus completed and the test center equipment utilized by the subscriber is restored to the initial condition.

During the various phases of the test program, a subscriber may restart the program by sending a "long" break. Each trunk is arranged to monitor for the "long" break and, in response thereto, return to Phase 1 of the program.

The arrangement of a trunk circuit, such as Trunk 110, is shown in FIG. 3. As previously described, when a control box is connected to the trunk the connection is effected by way of cable 115. As seen in FIG. 3, cable 115 includes an incoming signaling lead 307, an outgoing signaling lead 308 and coding leads identified as cable 301. Cable 301 extends to Character Coding circuit 302, which coding circuit comprises storage circuits for storing the call directing codes and the transmitter start codes applied by the operation of appropriate keys in Control Box 105 and signaled via cable 301. Character Coding circuit 302, in turn, applies the appropriate ones of the codes to Shift Register 318 under control of Program Count circuit 304 and Message Count circuit 303.

Input lead 307 and output lead 308 extend to Interface circuit 306. Interface circuit 306 functions to connect signaling leads 310 and 311 to output lead 308 and to connect input lead 307 to signaling lead 309.

Break Detect circuit 314 provides the function of monitoring signal lead 309 for the "short" break and the "long" break signals through the utilization of conventional timers. In response to a "short" break signal, Break Detect circuit 314 pulses the Phase Advance portion of Advance Program circuit 315. In response to the detection of a "long" break signal, Break Detect circuit 314 pulses Message Count circuit 303 and Program Count circuit 304. The function of monitoring for a "short" break may be precluded by End of Test Indication circuit 324.

Program Count circuit 304, together with Message Count circuit 303, provide the designation of the phase of the test program. In addition, Program Count circuit 304 provides the designation of each phase portion and each incremental character advance in the phases of the program. The advance of Program Count circuit 304 is controlled by Advance Program circuit 315. The pulse from Break Detect circuit 314 operates to reset Program Count circuit 304 back to the beginning of Phase 1 of the program.

As seen in FIG. 3, Program Count circuit 304 provides controls for various circuits in accordance with the phase of the program. These circuits include End of Test Indication circuit 324, Pause circuit 319, Character Coding circuit 302, DMC Attached circuit 320, DMC Connect circuit 325, Test Sentence Control circuit 327 and DMC Control circuit 328. The specific manners of the controls is described hereinafter.

As described above, Advance Program circuit 315 controls the advance of Program Count circuit 304. The Phase Advance portion of Advance Program circuit 315 is pulsed when a "short" break signal is monitored by Break Detect circuit 314 and, in addition, is pulsed by the operation of DMC Attached circuit 320. In either event, Advance Program circuit 315 operates to enable Program Count circuit 304 to advance the designation of the phase of the program. The character Advance portion of Advance Program circuit 315 is connected to Pause circuit 319 and to Shift Register 318. In response to the application of a pulse to the Character Advance portion of Advance Program circuit 315, the latter circuit operates to enable Program Count circuit 304 to advance the designation a character increment within the currently designated phase of the program.

Test Sentence Control circuit 327 is controlled by Program Count circuit 304 to select a lead from cable 130 and connect the lead to signal lead 311 in accordance with the designated phase of the program. More specifically, Test Sentence Control circuit 327 extends lead SW COMB to signaling lead 311 during Phase 1 of the program, extends lead UNDIS to signaling lead 311 during Phase 2 of the program, and extends lead SW BIAS to signaling lead 311 during Phase 3 of the program, thus obtaining the various test sentences from Signal Distribution 120, as previously described.

DMC Control circuit 328 operates to connect leads 208, 209 and 215 to leads 330, 310 and 309, respectively, during the various receiving test phases, as determined by Program Count circuit 304. This operates to connect the signaling leads from the DMC to Interface circuit 306 and pass the end-of-DMC connection signal on lead 211 to O.K. Detect circuit 326.

Assume now that the trunk circuit shown in FIG. 3 is connected to a control box and the attendant has operated the appropriate keys to store the CDC codes and the TSC codes in Character Coding circuit 302. With the trunk now seized, Shift Register 318 passes a steady marking condition through signaling lead 311. Interface circuit 306 and output lead 308 back to the teletypewriter line of the subscriber. Break Detect circuit 314 is now concurrently monitoring the line for a break signal from the subscriber.

When the "short" break signal is received and detected by Break Detect circuit 314, the Phase Advance portion of Advance Program circuit 315 is pulsed. This advances Program Count circuit 304 to Phase 1 of the program. In Phase 1 Program Count circuit 304 enables Character Coding circuit 302 to apply the first character of the end-of-message code sequence to Shift Register 318. Shift Register 318, upon the transmission of the character, pulses the Character Advance portion of Advance Programs circuit 315. This incrementally advances Program Count circuit 304 to the next character to enable Character Coding circuit 302 to then apply the second character of the end-of-message code sequence to Shift Register 318. In this manner Shift Register 318, under control of the clock pulse, applies the end-of-message code sequence to signaling lead 311 and then, by way of Interface circuit 306 and outgoing lead 308, to the teletypewriter line of the subscriber.

At the termination of the transmission of the end-of-message code sequence, Advance Program circuit 315 again incrementally advances Program Count circuit 304, and Program Count circuit 304, in turn, proceeds to enable Character Coding circuit 302 to apply the first character of the call directing code sequence to Shift Register 318. In this manner the designation of the phase of the program is continued to be incrementally advanced and the call directing code sequence is sequentially applied to Shift Register 318 which, under control of the clock pulses, passes the sequence back to the customer's teletypewriter line by way of signaling lead 311, Interface circuit 306 and output lead 308.

At the termination of the generation of the call directing code sequence, Program Count circuit 304 is again incrementally advanced by one character. At this designation Pause circuit 319 is enabled. This provides for a pause in the trunk operation to enable the subscriber teletypewriter to return the answer back code character "V" , as previously described. After the appropriate pause, Pause circuit 319 pulses the Character Advance portion of Advance Program circuit 315 to again incrementally advance Program Count circuit 304. Character Coding circuit 302 is now enabled to generate the first character of the next sequence, which positions the page record of the teletypewriter. In this manner the carriage-return line-feed sequence is registered in Shaft Register 318 and Advance Program circuit 315 continues to incrementally advance Program Count circuit 304.

When the last character of the carriage-return line-feed sequence is generated and transmitted, Program Count circuit 304 is again incrementally advanced. At this point in Phase 1 Test Sentence Control circuit 327 is enabled to extend lead SW COMB to signaling lead 311. In this manner the teletypewriter subscriber receives the switched combination distortion test sentence with the interposed character sequence identifying this type of distortion. This incremental portion of Phase1 is maintained until the customer returns a "short" break signal.

When the "short" break is returned by the customer, Break Detect circuit 314 pulses the Phase Advance portion of Advance Program circuit 315. This advances the phase designation of Program Count circuit 304 to Phase 2 of the program. In Phase 2, Program Count circuit 304 operates Test Sentence Control circuit 327 to extend lead UNDIS to signaling lead 311. The teletypewriter customer now receives an undistorted test sentence from Signal Distribution circuit 120. This condition is maintained until another "short" break is returned by the teletypewriter customer.

Upon the reception of the "short" break signal from the customer, Break Detect circuit 314 pulses Advance Program circuit 315 which, in turn, enables Program Count circuit 304 to advance the designated phase to Phase 3 of the program. In this phase Program Count circuit 304 enables Test Sentence Control circuit 327 to extend lead SW BIAS to signaling lead 311. Accordingly, the switched bias test sentence provided by Signal Distribution circuit 120 is passed to the teletypewriter customer. This condition is maintained until a "short" break signal is received from the customer, whereupon Advance Program circuit 315 enables Program Count circuit 304 to advance to Phase 4 of the test program. In Phase 4, Test Sentence Control circuit 327 again extends lead SW COMB to signaling lead 311 to send the switched combination distortion test sentence to the teletypewriter customer until a "short" break signal is received from the subscriber.

When the "short" break is now received, the designated of Program Count circuit 304 advances from Phase 4 to Phase 5. This phase is defined as the state wherein Program Count circuit 304 is advanced to the receiving test phase Message Count circuit 303 has no successful tests registered therein. In Phase 5 the trunk circuit is initially placed in the BID mode. In this mode, Program Count circuit 304 enables DMC Connect circuit 325 to bid for the distortion measuring circuit. In addition, at this time Test Sentence Control circuit 327 is enabled to extend lead LTRS from Signal Distribution circuit 120 to signal lead 311, thereby returning the periodic LETTERS characters to the teletypewriter line until the DMC is seized.

Refer now to FIG. 2. When DMC 121 is seized by a trunk, Busy circuit 221 is in the BUSY condition, precluding the operation Scan circuit 222. Scan circuit 222, when enabled, sequentially generates address codes, each address code corresponding to one of the trunk circuits. With the DMC attached to a trunk circuit, however, Scan circuit 222 is disabled and therefore not generating the address codes.

Assume now that the DMC is released by the trunk circuit. In this event, Reset DMC circuit 220 is enabled, as described hereinafter, to pulse Busy circuit 221. This restores Busy circuit 221 to the IDLE condition and removes the disabling signal passed to Scan circuit 222. Accordingly, Scan circuit 222 proceeds to generate the address code of the next subsequent trunk circuit, applying this code to the output leads thereof, shown in FIG. 2 as DMC–SCAN cable 223.

The address codes on DMC–SCAN cable 223 are scanned by DMC Connect circuit 325 when it is in the BID condition, as determined by the advance of Program Count circuit 304, to the BID mode of Phase 5 of the program. Assume now that Scan circuit 222 advances to the address of this trunk. DMC Connect circuit 325, recognizing its own address code, returns a pulse on SCAN STOP lead 224.

The pulse on SCAN STOP lead 224 is applied by way of cable 131 back to Busy circuit 221. This returns this latter circuit to the BUSY condition, disabling Scan circuit 222. Accordingly, the code address of the trunk is retained on the leads of DMC–SCAN cable 223. In addition, Busy circuit 221 applies a pulse to DMC ATTACHED lead 225. The pulse on lead 225 is passed by way of cable 131 back to DMC Attached circuit 320 in the trunk circuit. DMC Attached circuit 320 is enabled at this time by Program Count circuit 304 designating the advance of the program to the BID mode and, in addition, by the application of the address of the trunk applied to DMC–SCAN cable 223. In this ENABLED condition the DMC Attached circuit of the bidding trunk is advised by the pulse on lead 225 that this trunk has seized the DMC, i.e., the DCM Scan circuit has advanced to the address of the trunk and stopped thereat. In response to the pulse, DMC Attached circuit 320 pulses the Phase Advance portion of Advance Program circuit 315. This, in turn, advances the designation of the program phase to the code sequence generating portion of Phase 5 .

With Program Count circuit 304 advanced to the generating portion of Phase 5, it enables Character Coding circuit 302 to generate the first character of a code sequence, the code sequence being determined by the count in Message Count circuit 303. At this time, Message Count circuit 303 has a count of "O" therein. Character Coding circuit 302 therefore proceeds to generate the first character of the end-of-message code sequence. This character is applied to Shift Register 318, which, under control of the clock pulses, sends the character to the teletypewriter customer. Shift Register 318 thereafter pulses the Character Advance portion of Advance Program circuit 315 to incrementally advance the program to the next character of the end-of-message code sequence. In this manner each character of the end-of-message code sequence is generated and transmitted to the teletypewriter customer.

Following the end-of-message code sequence, the program is advanced to generate, in Phase 5 , the call directing code sequence. This sequence is provided in substantially the same manner as the end-of-message code sequence. Program Count circuit 304 continues to incrementally advance the designation of the program through the various characters in the sequence.

At the termination of the generation of the end-of-message and CDC sequences, Program Count circuit 304 enables DMC Control circuit 328 to extend signal leads 209 and 215 to signal leads 310 and 309, respectively, thereby connecting the teletypewriter customer to DMC 121. In addition, lead 208 from the DMC is connected by way of lead 330 to O.K. Detect circuit 326. Thus, the DMC is connected to the trunk and to the teletypewriter customer. At this time, as previously described, the teletypewriter customer, in response to the call directing code, returns the "V" answerback character. At the same time, the operation of Test Set 205 in the DMC is initiated in response to the completion of the connection to the trunk circuit.

Test Set 205 now proceeds to time for the answerback response, count the received characters upon the reception of the answerback response, and since only one character is received at this time, provide short term timing after the cessation of the answerback signals. When the short term timing interval terminates and no further characters are received, Test Set 205 provides to its output the indication of the distortion level of the received signals. This output is passed to Character Coder 206 and to the trunk circuit via lead 208, as previously described.

The signal on lead 208 is passed to O.K. Detect circuit 326 in the trunk. If the distortion measured is within satisfactory limits the signal on lead 208 enables O.K. Detect circuit 326 which, in turn, registers one successful test in Messsage Count circuit 303. Conversely, if the measured distortion is beyond the satisfactory threshold, Message Count circuit 303 continues to register no successful tests.

Returning now to Character Coder 206, a data character sequence is generated therein indicating the results of the tests by Tests Set 205. This sequence is passed back via lead 209 in cable 131 to the trunk circuit. In the trunk the signals are then applied by DMC Control circuit 328 to signal lead 310 and then by way of Interface circuit 306 back to the teletypewriter customer. This indicates to the teletypewriter customer the results of the distortion measurements.

Character Coder 206, at the termination of the generation of the code sequence, applies a pulse to End DMC Connection circuit 214 by way of OR gate 210. This pulses lead 211, which pulse is passed back through cable 131 to Wait circuit 322 in the trunk circuit. Wait circuit 322 at this time is enabled by Program Count circuit 304 with the trunk circuit in Phase 5 . Accordingly, the pulse applied on lead 211 enables Wait circuit 322 to pulse lead 226 and, in addition, to pulse the Phase Advance portion of Advance Program circuit 315.

The pulse on lead 226 is passed back to DMC 121 and then by way of OR gate 230 to Reset DMC circuit 220. Reset DMC circuit 220, in turn, restores Busy circuit 221 to the IDLE condition whereby, as previously described, Scan circuit 222 is again enabled and the DMC resumes scanning, searching for the next bidding trunk. With scanning resumed, the selection of DMC Connect circuit 325 and DMC Attached circuit 320 is removed since the address code on DMC scan cable 223 is now changed.

Return now to the pulsing of the Phase Advance portion of Advance Program circuit 315 by Wait circuit 322. 211, This advances the designation in Program Count circuit 304 to the WAIT mode in Phase 5 of the program. In this mode the trunk circuit is maintained in a "waiting" condition, monitoring for the "short" break signal which will be returned by the teletypewriter customer when he completes any necessary adjustments. This "short" break signal is monitored by Break Detect circuit 314, and upon detection thereof, Advance Program circuit 315 attempts to advance the program phase designation in Program Count circuit 304. This advance, as described below, is controlled by the number of successful tests registered in Message Count circuit 303.

Program Count circuit 304 is arranged, when designating the WAIT mode, to respond to the advance signal from Advance Program circuit 315 by restoring to the count condition identical to the previous count condition wherein the BID mode of Phase 5 was designated. If the prior distortion measurement was not within satisfactory limits, the count in Message Count circuit 303 still indicates no successful test. Accordingly, the designation of the program is restored to Phase 5 and, more specifically, to the BID mode of Phase 5 . The previously described operation of the trunk circuit in Phase 5 is repeated. The trunk bids for the DMC, seizing the DMC when scanned and thereupon advancing to the generating portion of Phase 5 to again send the end-of-message and call directing code sequences. The "V" answerback character is then received by the DMC which measures the distortion of the character, indicates to the trunk whether the test is within satisfactory limits, sends a data sequence indicating the results of the test and signals the trunk of the test completion. The trunk releases the DMC and again advances to the WAIT mode.

Assume now that the first receiving test measurements are within satisfactory limits. The count in Message Count circuit 303 therefore registers one successful test. Accordingly, in response to the advance signal, the designation of the program is advanced to Phase 6 and, more specifically, to the BID mode of Phase 6. The arrangement of Program Count circuit 304 in the BID mode of Phase 6 is identical to the arrangement in the BID mode of Phase 5. Accordingly, the operation of the trunk in the BID mode of Phase 6 is also identical. Thus the trunk again bids for the DCM, seizing the DMC when it scans the trunk and thereupon advancing to the generating portion of Phase 6.

In the generating portion of Phase 6, with Character Coding circuit 302 controlled by Message Count circuit 303 and Program Count circuit 304, the end-of-message code sequence is again generated, followed this time, however, by the transmitter-start code sequence of the remote teletypewriter. Accordingly, Phase 6 proceeds for the generating portion substantially the same way as the Phase 5 generating portion with the exception that one successful test is registered in Message Count circuit 303 to Control Character coding Circuit 302 to generate the transmitter-start code sequence rather than the call directing code sequence. After the transmission of these sequences Program Count circuit 304 enables DMC Control circuit 328 to again connect up the DMC to the trunk and to the teletypewriter line in the same manner as previously described.

At the remote teletypewriter station the transmitter-start code sequence starts up the teletypewriter thereat and Test Set 205 now proceeds to read and analyze the distortion of the tape message, providing an output to lead 208 and to Character Coder 206 after 32 characters are received. If the distortion reading is satisfactory a pulse is applied to lead 208 and back to the trunk circuit by way of cable 131. The pulse on lead 208 is then passed by way of DMC Control circuit 328 and lead 330 to O.K. Detect circuit 326. This registers two successful tests in Message Count circuit 303. Alternatively, if the message distortion was unsatisfactory, the "1" count is maintained in Message Count circuit 303.

The results of Test Set 205 applied to Character Coder 206 result in the generation of the data sequence which is passed back to the teletypewriter customer. At the conclusion of the generation of the character sequence, Character Coder 206 pulses End DMC Connection circuit 214 by way of OR gate 210. This, as previously described, pulses Wait circuit 322 in the trunk. Accordingly, Reset DMC circuit 220 is pulsed to restore Busy circuit 221 to the IDLE condition, thereby releasing the DMC and enabling it to reinitiate scanning. Wait circuit 322 also pulses Advance Program Circuit 315 which, in turn, advances Program Count circuit 304 to the Wait mode.

In the Phase 6 WAIT mode, if the prior test was unsuccessful, the trunk awaits a "shorts" break signal from the teletypewriter customer to restore to the BID mode of Phase 6 of the program to again provide the second receiving test. In the event, however, that two successful tests are registered in Message Count circuit 303, the advancing of Program Count circuit 304 to the WAIT mode enables End-of-Test Indication circuit 324. This raises the visual and audible alarms to advice the test center attendant that the program has been completed. In addition, End-of-Test Indication circuit 324 enables Break Detect circuit 314 to monitor for a "long" break signal. Accordingly, the teletypewriter customer at this time may send a "long" break signal to restart the program, starting at Phase 1, if he so desires. This break signal, however, must be received before the test center attendant removes the line plug from the switchboard. It is noted that End-of-Test Indication circuit 324 also is arranged to preclude Break Detect circuit 314 from monitoring for a "short" break signal. In other words, if two successful tests are registered in the trunk the trunk circuit is not permitted to advance the program phase.

It was also previously noted that Test Set 205 pulses lead 212 in the event that upon the initiation of a receiving test the teletypewriter customer fails to send any characters within a predetermined interval of time. Referring to FIG. 2, it is seen that the pulse on lead 212 is applied to Emergency Reset circuit 229 and, in addition, to End DMC Connection circuit 214 by way of OR gate 210. Emergency Reset circuit 229 pulses Reset DMC circuit 220 by way of OR gate 230 in the event that End DMC Connection circuit 214 does not effect the normal pulsing of Reset DMC circuit 220 by way of the trunk circuit, as previously described. This redundant feature is provided to permit the release of the DMC and the reinitiating of scanning in the event of a false seizure. That is, in the event that the DMC stops scanning without being seized by a trunk, Emergency Reset circuit 229 still permits reinitiating of the scanning, since Reset DMC circuit 220 is pulsed directly rather than by way of trunk circuit. Emergency Reset circuit 229 may also include alarm circuits to advise the test center attendant that an emergency reset has occurred.

Although a specific embodiment of this invention has been shown and described, it will be understood that various modifications may be made without departing from the spirit of this invention and within the scope of the appended claims.

We claim:

1. A system for providing a multiphase program for testing data sets comprising:

a measuring circuit;

a plurality of trunk circuits, each trunk circuit associable with a date set and including means for designating the phase of the testing program for the associated date set and arranged during receiving test phases to bid for said measuring circuit; and an exclusion circuit for providing seizure of the measuring circuit by a bidding trunk, said measuring circuit being arranged to provide measurements of signals from the data set associated with the trunk circuit that effected seizure and to thereafter release from the trunk circuit, characterized in that said trunk circuit includes means responsive to a predetermined signal from the associated date set to enable said designating means to advance to a receiving test phase, whereby the data set controls the bidding for the measuring circuit.

2, A system in accordance with claim 1 wherein said trunk circuit is further arranged during receiving test phase to stop the program when the measuring circuit releases.

3. A system in accordance with claim 1 wherein said means responsive to a predetermined signal from the associated data set is also effective when the trunk circuit stops the program to initiate a new phase of the program when the predetermined signal is received.

4. A system in accordance with claim 1 wherein said measuring circuit is also arranged to indicate the measurements and means in said trunk circuit are controlled thereby to enable said designating means to select which phase is next designated.

5. In a system for testing remote date sets, a plurality of trunk circuits, each trunk circuit associable with one of the date sets at a time, a common measuring circuit and an exclusion circuit for permitting seizure of the measuring circuit by a bidding trunk circuit, said measuring circuit being arranged to provide measurements of signals coming in from the data set associated with the trunk circuit that effected seizure and to thereafter release from the trunk circuit, characterized in that said trunk circuit includes means responsive to a predetermined signal from the associated data set to enable said trunk circuit to bid for said measuring circuit.

6. A system for providing a multiphase program for testing a remote date set, each phase of the program having a plurality of incremental steps and certain phases including a step wherein signals are transmitted to the remote data set and a further step wherein signals are received from the remote data set, the system comprising a trunk circuit including means for designating the phase of the program and means for advancing the designated phase through each step, means for measuring signals received from the remote data set during the further step to determine whether the signals exceed preset criteria, means responsive to the measurements for counting the number of steps wherein the measured signals exceed the preset criteria, and means responsive to the counting means for controlling the designation of the program phase by the designating means.

7. A system in accordance with claim 6 wherein the controlling means advances the designation to the next subsequent program phase when the counting means count is advanced.

8. A system in accordance claim 6 wherein the controlling means repeats the designation of the program phase when the counting means fails to advance.